United States Patent [19]

Quist

[11] Patent Number: 5,396,878
[45] Date of Patent: Mar. 14, 1995

[54] HOT WATER KETTLE

[76] Inventor: Ross G. Quist, 246 E. 650 South, Kaysville, Utah 84037

[21] Appl. No.: 251,127

[22] Filed: May 31, 1994

[51] Int. Cl.⁶ .......................... A47J 27/00; F24H 1/00
[52] U.S. Cl. ................................... 126/373; 126/344; 222/146.2
[58] Field of Search .................... 126/373, 350 R, 390, 126/344, 265, 380, 345, 383, 384, 386, 29, 30; 220/601; 222/146.2

[56] References Cited

U.S. PATENT DOCUMENTS

| 2,501,142 | 3/1950 | Reichart | 126/373 |
| 4,026,274 | 3/1977 | Gutierrez | 126/390 |
| 4,191,173 | 3/1980 | Dedeian et al. | 126/373 |
| 4,506,657 | 3/1985 | Trolle | 126/373 |

FOREIGN PATENT DOCUMENTS 361665  11/1931  United Kingdom ................ 126/373

Primary Examiner—James C. Yeung
Attorney, Agent, or Firm—Terry M. Crellin

[57] ABSTRACT

Apparatus for heating water over an open fire comprises a kettle having a substantially flat bottom and an upstanding perimeter sidewall. Two openings are provided in the upper portion of the sidewall of the kettle. A water inlet tube extends through one of the openings and has an open, inner end that is positioned in the lower portion of the interior of the kettle. The open, outer end of the water inlet tube is positioned outside the kettle and is adapted to have aliquots of cold water poured into the open end so that the cold water will flow into the kettle through the water inlet tube, with the cold water entering the lower portion of the interior of the kettle. A water outlet tube extends through the other opening and has an open, inner end that is positioned in the upper portion of the interior of the kettle. The open, outer end of the water outlet tube is positioned outside the kettle and forms a hot water spout on the outside of the kettle. As aliquots of cold water are poured into the water inlet tube, similar sized aliquots of hot water are dispensed from the kettle through the water outlet tube. The kettle remains full of water at all times, and the cold water is rapidly heated in the bottom portion of the kettle. The heated water rises to the upper portion of the kettle as additional cold water is added to the kettle.

8 Claims, 2 Drawing Sheets

HOT WATER KETTLE

BACKGROUND OF THE INVENTION

1. Field of the Invention

The present invention relates to apparatus for heating water over an open camp fire or other similar hot heat source. In particular, the invention relates to a kettle that is adapted to be filled with water and then placed over a heat source to heat the water therein, with the kettle being provided with means for adding cold water to the kettle and simultaneously withdrawing an equal amount of hot water from the kettle.

2. State of the Art

Heating of water over an open fire or hot coals is generally achieved by one of two procedures. In the first, a large kettle of water can be supported over the fire or coals, and hot water is dipped from the kettle using a ladle or other dipping device. As the kettle becomes empty, fresh, cold water is added to the kettle and a period of time is necessary for the cold water to be heated before hot water is again available. In the second procedure, a water pot having a spout is supported over the fire or coals to heat water contained in the pot. When hot water is desired, the pot must be lifted from its support over the fire or hot coals, and hot water is poured out of the pot through the spout thereon. When hot water in the pot has been used, fresh, cold water is added to the pot, and the pot is replaced over the fire or coals to heat the water.

It would be highly desirable to have a water kettle or pot that could be left in place on the support over a heat source, such as a fire, coals or stove and from which a desired amount of hot water could be obtained simply adding the same amount of cold water to the kettle or pot and collecting the hot water that is displaced from the kettle or pot by the addition of the cold water. The added cold water would start to be heated immediately, and the kettle or pot would never be emptied. Because cold water is more dense than hot water, the cold water added to the kettle would go to the bottom of the kettle and hot water would still be available for being dispensed from the top of the kettle. Unfortunately, there is nothing available in the market in the form of a pot or kettle which can be supported over a fire or coals and which has a provision for adding aliquots of cold water and simultaneously withdrawing an equal sized aliquot of hot water. A search of the relevant U.S. Patents did not disclose such a pot or kettle either.

OBJECTIVES AND BRIEF DESCRIPTION OF THE INVENTION

A principal objective of the invention is to provide a novel, water heating kettle that is to be used over an open fire or hot coals, with the kettle further being provided with means for adding aliquots of cold water to the kettle and simultaneously withdrawing a like amount of hot water from the kettle.

A particular objective of the present invention is to provide such a kettle that has a water inlet tube and a water outlet tube extending through the top portion of the sidewall of the kettle, with the water inlet tube having an inside open end located in the bottom portion of the inside of the kettle, and with the outlet tube being adapted to withdraw hot water from the top portion of the kettle, whereby cold water poured into the water inlet tube enters the kettle in the bottom portion of the kettle and an equal amount of hot water is withdrawn from the top portion of the kettle.

Another objective of the present invention is to provide grommet seals for the inlet and outlet tubes that allow the inlet and outlet tubes to be removed from the kettle for storage or for use of the kettle as a standard stock pot.

The above objectives are achieved in accordance with the present invention by providing novel water heating kettle that has first and second openings in the upstanding sidewall of the kettle. The openings in the upstanding sidewall are located in the top portion of the sidewall and generally at a vertical distance from an upper edge of the sidewall that is no greater than about one-third of the distance between the upper edge of the sidewall and the lower edge of the sidewall at the bottom of the kettle.

A water outlet tube extends through the first opening in the sidewall of the kettle and means are provided for making a watertight seal between the water outlet tube and the first opening in the sidewall. The water outlet tube has an open, inside end located inside the kettle and positioned in the top portion of the kettle. Generally, the open, inside end of the water outlet tube is positioned at a distance from the upper edge of the sidewall that is no greater than about one-third of the distance between the upper edge of the sidewall and the lower edge of the sidewall at the bottom of the kettle.

A water inlet tube extends through the second opening in the sidewall of the kettle and means are provided for making a watertight seal between the water inlet tube and the second opening in the sidewall. The water inlet tube has an open, inside end located inside the kettle and positioned in the bottom portion of the kettle. Generally, the open, inside end of the water inlet tube is positioned at a distance from the upper edge of the sidewall that is at least about two-third of the distance between the upper edge of the sidewall and the lower edge of the sidewall at the bottom of the kettle. The water inlet tube has an open, outside end located outside the kettle and oriented so that the open, outside end faces generally upwardly so that water can be poured into the open, outside end.

In use, the kettle is filled with water and supported over a heat source, such as an open fire or hot coals from an open fire and the water in the kettle is allowed to become hot. When the water in the kettle is sufficiently heated, separate aliquots of hot water can be withdrawn from the kettle by pouring an aliquot of cold water into the outside, open end of the water inlet tube. The aliquot of cold water is fed by the water inlet tube to the bottom portion of the kettle and displaces hot water upwardly from the bottom portion of the kettle. An aliquot of hot water in the same amount as the aliquot of cold water added to the kettle is withdrawn from the outlet tube and collected simultaneously with the pouring of the cold water into the inlet tube. A plurality of aliquots of hot water can be withdrawn from the kettle in rapid sequence, and as long as the total amount of water in the successive aliquots does not exceed about one-half to two-thirds of the volume of the kettle, all aliquots that are withdrawn will be of a sufficient hot temperature. The aliquots of cold water added to the kettle will be rapidly heated to the temperature of the water in the kettle.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENTS

Figure 1:
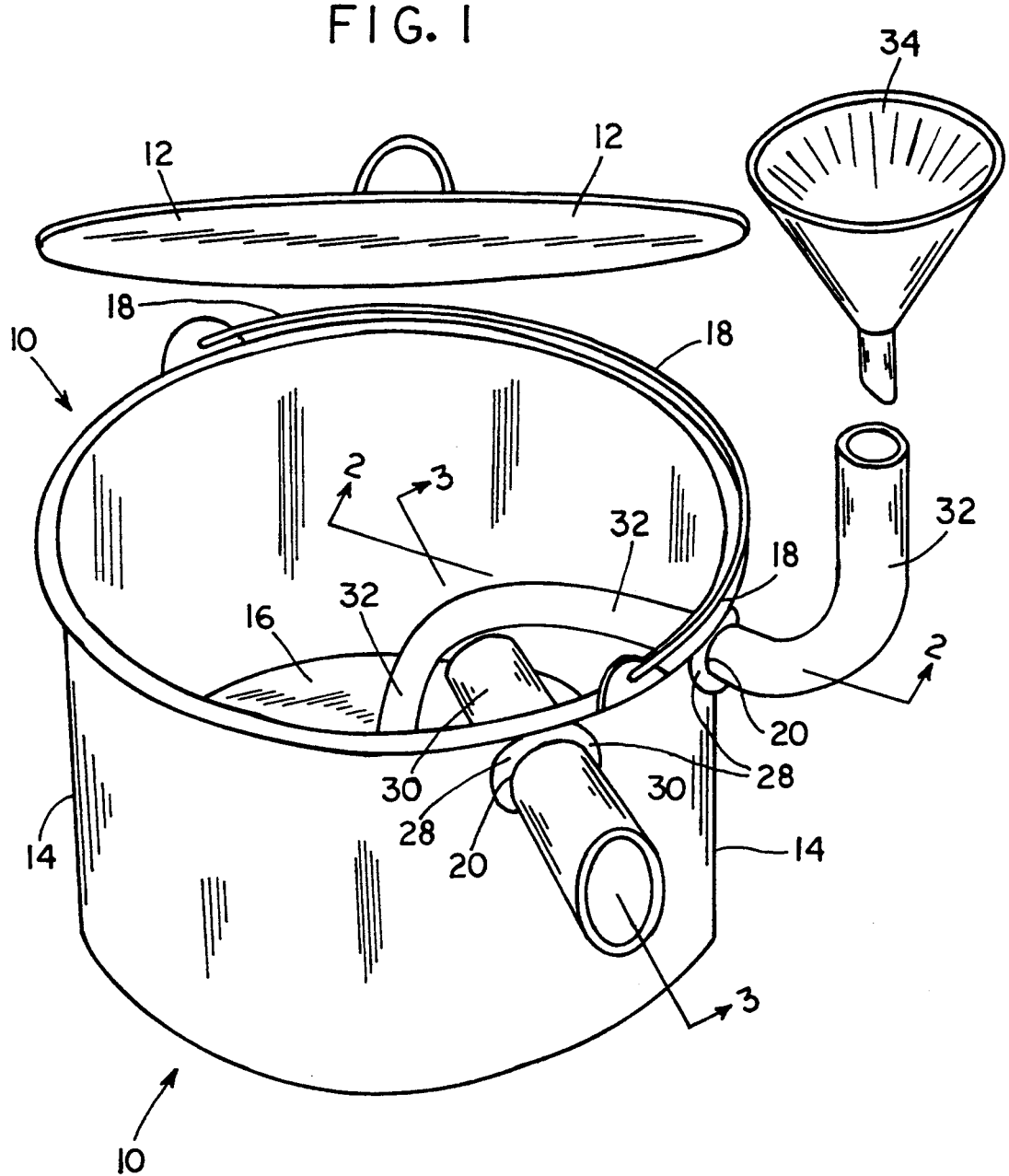
FIG. 1 is a pictorial representation of a hot water kettle in accordance with the present invention.
Figure 2:
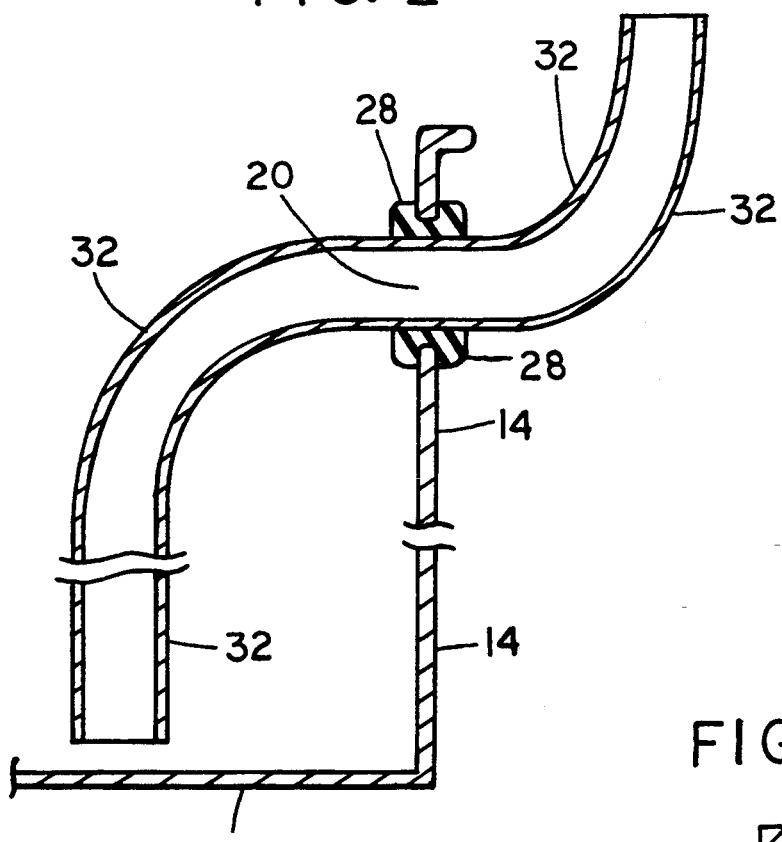
FIG. 2 is a cross section taken along line 2—2 of FIG. 1.

Referring now to the drawings, there is shown preferred embodiments of apparatus in accordance with the present invention for heating water over a heat source such as hot coals generated by an open fire, a camp stove or a wood burning stove. The apparatus comprises an open kettle 10 that has a removable lid 12 that fits on the open upper edge of the perimeter sidewall 14 of the kettle 10. The sidewall 14 extends upwardly from a bottom 16 which is integrally attached to the lower edge of the perimeter sidewall 14 so that the kettle 10 forms a container for holding water. Advantageously, the bottom 16 of the kettle 10 has a circular perimeter, and the perimeter sidewall 14 is cylindrical in shape. However, other shapes could be used. The kettle 10 could be square, rectangular or oval in shape.

The kettle 10 further can advantageously have a bail handle 18 that extends in a generally arched shape from a first end at one side of the kettle 10 to a second end that is situated on the other side of the kettle 10 diametrically from the first end. The first and second ends of the handle 18 are positioned adjacent to the upper edge of sidewall 14. The ends of the handle 18 are attached to the sidewall 14 of the kettle 10 by brackets which are integrally attached to the sidewall 14 of the kettle 10 and which allow the handle 18 to pivot back and forth from an upstanding position extending over the kettle 10 to a reclined position around the upper perimeter of the kettle 10 as is well known in the art. As further well known in the art, the lid 12 can be situated on the top edge of the sidewall 14 of the kettle 10 even during pivotal movement of the handle 18 from one position to another.

Two openings 20 are provided in the upper portion of the sidewall 14 of the kettle 10. The openings 20 are located at a vertical distance from the upper edge of the sidewall 14 that is no greater than about one-third of the distance between the upper edge of the sidewall 14 and the bottom 16 of the kettle 10. As illustrated, the two openings 20 are preferably located closely adjacent to the upper edge of the sidewall 14. Preferably, the openings 20 are located such that the upward most edge of each of the openings is spaced by three-eights of an inch to three-fourths of an inch below the top edge of the sidewall 14.

A water outlet tube 30 extends through the first of the openings 20. The water outlet tube 30 has an open, inside end that is located inside the kettle 10 at a distance from the upper edge of the sidewall that is no greater than about one-third of the distance between the upper edge of the sidewall 14 and the bottom 16 of the kettle 10. In the embodiment illustrated in FIG. 1, the water outlet tube 30 is a straight tube that extends through the first of the openings 20 in the sidewall 14 such that the inner, open end of the tube is concentric with the respective opening 20 and is then at the same elevation with respect to the kettle 10 as the respective opening 20. Means are provided for making a watertight seal between the water outlet tube 30 and the first of the openings 20 in the sidewall 14 of the kettle 10.

A water inlet tube 32 extends through the second of the openings 20. The portion of the water inlet tube 32 that is located inside the kettle 10 curves downwardly so that an open, inside end of the water inlet tube 32 is positioned at a distance from the upper edge of the sidewall 14 that is at least about two-thirds of the distance between the upper edge of the sidewall 14 and the bottom 16 of the kettle 10. Advantageously, the open, inside end of the water inlet tube 32 is spaced from about one-quarter of an inch to an inch from the bottom 16 of the kettle 10.

The water inlet tube 32 further has an open, outside end located outside the kettle 10, and the portion of the tube 32 that is on the outside of the kettle 10 curves upwardly so that the open, outside end of the water inlet tube 32 faces generally upwardly so that water can be poured into the open, outside end of the tube 32. A funnel 34 is advantageously provided to aid in pouring water into the open, outside end of the water inlet tube 32. Means are provided for making a watertight seal between the water inlet tube 32 and the second of the openings 20 in the sidewall 14 of the kettle 10.

The means for making the watertight seal between the openings 20 in the sidewall 14 of the kettle 10 and the respective water outlet tube 30 and water inlet tube 32 and preferably resilient grommets 28 that are made of a polymeric material. Each of the grommets 28 fit inside one of the respective openings 20 in the sidewall 14 of the kettle 10. In the first of the openings 20, the water outlet tube 30 makes a watertight seal with the first grommet 28, and this grommet 28 in turn makes a watertight seal with the respective opening 20 in the sidewall 14 of the kettle 10. Likewise, in the second of the openings 20, the water inlet tube 32 makes a watertight seal with the second grommet 28, and the second grommet 28 in turn makes a watertight seal with the respective opening 20 in the sidewall 14 of the kettle 10.

The use of the resilient, polymeric grommets 28 to seal the water inlet tube 32 and water outlet tube 30 to the openings 20 in the sidewall 14 of the kettle 10 is advantageous as compared to other means for making such a seal such as welding or brazing of the tubes 30 and 32 to the sidewall 14. When resilient, polymeric grommets 28 are used rather than permanently affixing the tubes 30 and 32 in the openings 20, the tubes 30 and 32 can easily and quickly be removed form the kettle 10 by sliding the tubes 30 and 32 through the grommets 28. This allows the tubes 30 and 32 to be readily removed so that they can be stored totally inside the kettle 10. In addition, the tubes 30 and 32 can be quickly removed if the kettle 10 is desired to be used as a conventional stock pot.

As mentioned previously, and as shown in the drawings, the kettle 10 is preferably provided with an arched, bail handle 18 that extends from one side of the kettle 10 to the other, with the opposite ends of the handle 18 being positioned adjacent to the upper edge of the sidewall 14 of the kettle 10. As illustrated in the drawings, when the kettle 10 has such a bail handle 18, it is preferred to located the two openings 20 next to the upper edge of the sidewall 14 so that they are spaced from each other on the one side of the kettle 10 with a first end of the handle 18 being positioned between the two openings 20 and equidistant from the two openings 20. Advantageously, the two openings 20 are spaced on each side of the one end of the handle 18 by equal distances of between about 2 to 3 inches from the end of the handle 18 to the centerlines of the respective openings 20. By positioning the openings 20 equidistantly from the one end of the handle 18, the weight of the water inlet and outlet tubes 32 and 30 which are associated with the openings 20 are evenly supported on each side of the handle 18 when the kettle is lifted by the handle 18 so that the kettle 10 will not tip in an unstable manner as it is lifted by the handle 18.

In using the kettle 10, it is first filled with cold water and supported over an open fire. When the water in the kettle is sufficiently heated, hot water can be withdrawn from the kettle 10 by pouring an aliquot of cold water into the water inlet tube 32 and simultaneously collecting a similar sized aliquot of hot water from the water outlet tube 30. For example if a cup of hot water is desired, one simply pours a cup of cold water into the water inlet tube 32 while simultaneously holding a second cup under the outside end of the water outlet tube 30 so as to catch the hot water flowing out of the kettle 10 through the water outlet tube 30. As mentioned above, it is advantageous to position a funnel 34 in the open, outer end of the water inlet tube 32 to aid in pouring of the cold water into the water inlet tube 32.

Figure 3:
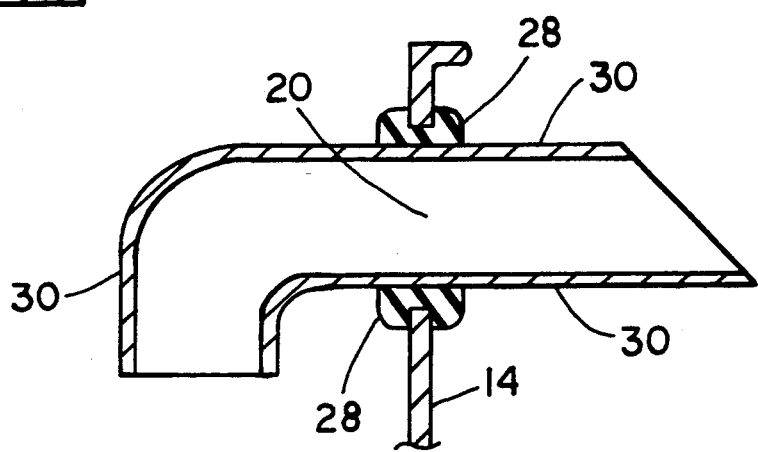
FIG. 3 is a cross section taken along line 3—3 of FIG. 1, but showing a slightly modified embodiment of the internal end of the water outlet tube as compared to that of FIG. 1.

The removable lid 12 can remain in place on the kettle 10 once the kettle 10 has been filled with water and positioned over the source of heat. The lid 12 prevents foreign debris from being blown into the kettle 10. As a further prevention of having floating debris being dispersed from the kettle 10 in the hot water being withdrawn therefrom, the portion of the water outlet tube 30 that is positioned within the kettle can be curved slightly downwardly as is shown in FIG. 3. The open, inner end of the water outlet tube 30 as shown in FIG. 3 faces the bottom 16 of the kettle 10 and is preferably located about one-quarter of an inch to one-half inch below the lowermost portion of the opening 20 in the sidewall 14 of the kettle 10 through which the water inlet tube 30 extends. As can be seen from FIG. 3, the water level in the kettle 10 will always be above the open inner end of the water outlet tube 30, and hot water can still freely flow through the water outlet 30 as cold water is added to the kettle 10 through the water inlet tube 32. Any floating debris will remain on the surface of the hot water in the kettle 10 and will not be allowed to flow from the kettle 10 in the hot water being dispensed through the water outlet tube 30.

Although preferred embodiments of the hot water kettle of the present invention have been illustrated and described, it is to be understood that the present disclosure is made by way of example and that various other embodiments are possible without departing from the subject matter coming within the scope of the following claims, which subject matter is regarded as the invention.

I claim:

1. Apparatus for heating water over a heat source, said apparatus comprising
   a kettle for containing the water to be heated, said kettle having a bottom and a perimeter sidewall that extends upwardly from said bottom so as to have an open upper edge;
   two openings in the upstanding sidewall, said openings being located at a vertical distance from the upper edge of said sidewall that is no greater than about one-third of the distance between the upper edge of said sidewall and said bottom of said kettle;
   first and second grommets made of a polymeric material, each grommet being fit inside one of the respective openings in said sidewall;
   a water outlet tube fit snugly through the first grommet so that the water outlet tube makes a watertight seal with the first grommet and the first grommet makes a watertight seal with the respective opening in said sidewall, said water outlet tube having an open, inside end located inside said kettle at a distance from the upper edge of said sidewall that is no greater than about one-third of the distance between the upper edge of said sidewall and said bottom of said kettle; and
   a water inlet tube fit snugly through the second grommet so that the inlet tube makes a watertight seal with the second grommet and the second grommet makes a watertight seal with the respective opening in said sidewall, said water inlet tube having an open, inside end located inside said kettle at a distance from the upper edge of said sidewall that is at least about two-thirds of the distance between the upper edge of said sidewall and said bottom of said kettle, said water inlet tube further having an open, outside end located outside said kettle and oriented so that the open, outside end faces generally upwardly so that water can be poured into said open, outside end.

2. Apparatus in accordance with claim 1 wherein
   said kettle is further provided with an arched handle that extends from a first end at one side of the kettle to a second end at the other side of the kettle, said first and second ends of said handle further being positioned adjacent to the upper edge of said sidewall; and
   said two openings are located next to said upper edge of said sidewall and are spaced from each other on said one side of the kettle so that the first end of said handle on said one side of said kettle is located between said two openings and equidistant from said two openings.

3. Apparatus in accordance with claim 1 wherein there is further provided a funnel that is removably received in the open, outside end of said water inlet tube to aid in pouring water into said open, outside end of said water inlet tube.

4. Apparatus in accordance with claim 1 wherein there is further provided a removable cover for said kettle that fits on the upper edge of said sidewall.

5. Apparatus for heating water over a heat source, said apparatus comprising
   a kettle for containing the water to be heated, said kettle having a bottom and a perimeter sidewall that extends upwardly from said bottom so as to have an open upper edge;
   first and second openings in the upstanding sidewall, said openings being located at a vertical distance from the upper edge of said sidewall that is no greater than about one-third of the distance between the upper edge of said sidewall and said bottom of said kettle;
   a water outlet tube extending through the first opening in said sidewall, said water outlet tube having an open, inside end located inside said kettle at a distance from the upper edge of said sidewall that is no greater than about one-third of the distance between the upper edge of said sidewall and said bottom of said kettle;

means for making a watertight seal between the water outlet tube and the first opening in said sidewall;

a water inlet tube extending through the second opening in said sidewall, said water inlet tube having an open, inside end located inside said kettle at a distance from the upper edge of said sidewall that is at least about two-thirds of the distance between the upper edge of said sidewall and said bottom of said kettle, said water inlet tube further having an open, outside end located outside said kettle and oriented so that the open, outside end faces generally upwardly so that water can be poured into said open, outside end; and means for making a watertight seal between the water inlet tube and the second opening in said sidewall.

6. Apparatus in accordance with claim 5 wherein said kettle is further provided with an arched handle that extends from a first end at one side of the kettle to a second end at the other side of the kettle, said first and second ends of said handle further being positioned adjacent to the upper edge of said sidewall; and said first and second openings are located next to said upper edge of said sidewall and are spaced from each other on said one side of the kettle so that the first end of said handle on said one side of said kettle is located between said first and second openings and equidistant from said first and second openings.

7. Apparatus in accordance with claim 5 wherein there is further provided a funnel that is removably received in the open, outside end of said water inlet tube to aid in pouring water into said open, outside end of said water inlet tube.

8. Apparatus in accordance with claim 5 wherein there is further provided a removable cover for said kettle that fits on the upper edge of said sidewall.

* * * * *